United States Patent
Downey et al.

(10) Patent No.: US 12,442,074 B2
(45) Date of Patent: Oct. 14, 2025

(54) SYSTEM AND METHOD FOR CONTROLLING FORELINE PRESSURE

(71) Applicant: Applied Materials, Inc., Santa Clara, CA (US)

(72) Inventors: Ryan T. Downey, San Jose, CA (US); James L'Heureux, Santa Clara, CA (US); Rony David Mathew, Bengaluru (IN)

(73) Assignee: Applied Materials, Inc., Santa Clara, CA (US)

( * ) Notice: Subject to any disclaimer, the term of this patent is extended or adjusted under 35 U.S.C. 154(b) by 272 days.

(21) Appl. No.: 17/896,025

(22) Filed: Aug. 25, 2022

(65) Prior Publication Data
US 2024/0068093 A1 Feb. 29, 2024

(51) Int. Cl.
*H01J 37/32* (2006.01)
*C23C 16/44* (2006.01)

(52) U.S. Cl.
CPC ...... *C23C 16/4412* (2013.01); *H01J 37/3244* (2013.01); *H01J 37/32834* (2013.01)

(58) Field of Classification Search
CPC ....... C23C 16/44; C23C 16/455; C23C 16/00; C23C 16/02; C23C 16/34; C23C 16/50; C23C 16/52; C23C 16/18; C23C 16/40; C23C 16/448; C23C 16/505; C23C 14/54; C23C 14/56; C23C 16/56; C23C 16/46; C23C 16/511; C23C 16/24; C23C 16/30;
(Continued)

(56) References Cited

U.S. PATENT DOCUMENTS 4,725,204 A * 2/1988 Powell ............... C23C 16/4412
417/205
5,070,813 A * 12/1991 Sakai ................. H01L 21/6715
118/319

(Continued)

FOREIGN PATENT DOCUMENTS

| KR | 20070016446 A | 2/2007 |
|----|---------------|--------|
| WO | 2011-068936 A2 | 6/2011 |
| WO | 2021-025819 A1 | 2/2021 |

OTHER PUBLICATIONS

"Vacuum Pressure Control for Semiconductor Fabrication", Technical Resources, https://www.mks.com/n/semiconductor-vacuum-pressure-control, 5 pages.

(Continued)

*Primary Examiner* — Rudy Zervigon
(74) *Attorney, Agent, or Firm* — Patterson + Sheridan, LLP (57) ABSTRACT

A system and method for controlling pressure in a foreline of a processing system are disclosed herein that reduce variation in foreline pressure. In one example, a processing system is provided that includes a first process chamber, a first pump, a foreline, and a first foreline pressure control system. The first pump has an inlet and an outlet. The inlet of the first pump coupled to an exhaust port of the first process chamber. The foreline is coupled to the outlet of the first pump. The first foreline pressure control system is fluidly coupled to the foreline downstream of the first pump. The first foreline pressure control system is operable to control a pressure in the foreline independent from operation of the first pump.

17 Claims, 6 Drawing Sheets

(58) Field of Classification Search
CPC ......... C23C 16/54; C23C 14/00; C23C 14/06;
C23C 16/08; C23C 16/22; C23C 16/452;
C23C 16/458; C23C 16/507; C23C 14/08;
C23C 14/50; C23C 14/52; C23C 16/04;
C23C 16/06; C23C 16/14; C23C 16/28;
C23C 16/32; C23C 16/48; C23C 14/34;
C23C 14/35; C23C 14/44; C23C 16/503;
C23C 16/509; C23C 16/513; C23C 22/82;
C23C 28/00; C23C 16/4412; C23C
16/45561; B01D 53/00; B01D 53/32;
B01D 53/68; B01D 53/94; B01D 53/34;
B01D 53/86; B01D 53/70; B01D 53/14;
B01D 53/75; B01D 53/78; B01D 5/00;
B01D 53/74; B01D 53/56; B01D 50/00;
B01D 53/38; B01D 53/46; B01D 47/02;
B01D 53/50; B01D 53/76; B01D 53/04;
B01D 53/18; B01D 53/92; B01D 8/00;
B01D 47/06; B01D 53/02; B01D 53/26;
B01D 47/00; B01D 47/10; B01D 53/22;
B01D 53/30; B01D 45/00; B01D 53/62;
B01D 53/64; B01D 19/02; B01D 19/04;
B01D 35/30; B01D 45/16; B01D 46/00;
B01D 46/24; B01D 53/60; B01D 53/79;
B01D 53/88; B01D 53/90; B01D 35/00;
B01D 43/00; B01D 45/02; B01D 45/12;
B01D 45/14; B01D 47/12; B01D 50/40;
B01D 51/06; B01D 53/047; B01D 53/24;
B01D 53/40; B01D 53/48; B01D 53/52;
B01D 53/54; B01D 53/72; B01D 53/73;
B01D 53/77; H01L 21/67; H01L 21/02;
H01L 21/306; H01L 21/311; H01L 21/00;
H01L 21/44; H01L 21/683; H01L
21/3065; H01L 21/687; H01L 21/205;
H01L 21/285; H01L 21/308; H01L 21/31;
H01L 21/312; H01L 21/318; H01L
21/3205; H01L 21/465; H01L 21/469;
H01L 21/66; H01L 21/677; H01L
21/67253; H01L 21/67248; H01L 22/20;
H01J 37/3244; H01J 37/32834; H01J
37/32935; H01J 37/3299; H01J 37/32972;
H01J 37/32963; H01J 37/32449
USPC ................ 118/715, 663, 665, 668, 688;
156/345.33, 345.34, 345.24, 345.25,
156/345.26, 345.27, 345.28
See application file for complete search history.

(56) References Cited

U.S. PATENT DOCUMENTS

| | | | | |
|---|---|---|---|---|
| 5,445,709 A * | 8/1995 | Kojima | ............ | H01J 37/32532 |
| | | | | 156/345.37 |
| 5,565,038 A * | 10/1996 | Ashley | ............... | C23C 16/4405 |
| | | | | 134/21 |
| 5,902,403 A * | 5/1999 | Aitani | ............... | H01J 37/32963 |
| | | | | 156/916 |
| 6,017,414 A * | 1/2000 | Koemtzopoulos | ......................... | |
| | | | | H01J 37/32862 |
| | | | | 134/1.1 |
| 6,153,529 A * | 11/2000 | Agarwal | ............... | C23C 16/452 |
| | | | | 438/758 |
| 6,228,170 B1 * | 5/2001 | Chen | ...................... | C23C 16/52 |
| | | | | 118/715 |
| 6,500,501 B1 * | 12/2002 | Akram | .................... | C23C 16/42 |
| | | | | 427/255.393 |
| 7,021,903 B2 * | 4/2006 | Bailey | .................... | F04D 25/00 |
| | | | | 417/313 |
| 7,201,174 B2 * | 4/2007 | Fukiage | .................... | B08B 7/00 |
| | | | | 134/1.1 |
| 7,278,831 B2 * | 10/2007 | Bailey | ............... | H01L 21/67155 |
| | | | | 417/313 |
| 7,335,396 B2 * | 2/2008 | Carpenter | ............ | G05D 7/0647 |
| | | | | 118/692 |
| 7,559,992 B2 * | 7/2009 | Suzuki | ............. | H01L 21/67017 |
| | | | | 134/1.1 |
| 7,647,886 B2 * | 1/2010 | Kubista | ............... | C23C 16/4412 |
| | | | | 118/663 |
| 8,366,869 B2 * | 2/2013 | Nozawa | ........... | C23C 16/45502 |
| | | | | 118/704 |
| 10,282,659 B2 | 5/2019 | Fang et al. | | |
| 10,329,668 B2 * | 6/2019 | Franken | ............... | C23C 16/4412 |
| 10,732,943 B2 | 8/2020 | Sun et al. | | |
| 10,824,939 B2 | 11/2020 | Fang et al. | | |
| 10,902,315 B2 | 1/2021 | Fang et al. | | |
| 11,093,225 B2 | 8/2021 | Yu et al. | | |
| 11,098,400 B2 * | 8/2021 | Strobel | ............ | B29D 11/00009 |
| 11,514,324 B2 | 11/2022 | Sui et al. | | |
| 2003/0094136 A1 * | 5/2003 | Bartholomew | ..... | C23C 16/4412 |
| | | | | 118/715 |
| 2004/0226507 A1 * | 11/2004 | Carpenter | ............... | C23C 16/52 |
| | | | | 118/715 |
| 2005/0081786 A1 * | 4/2005 | Kubista | ............... | C23C 16/4412 |
| | | | | 118/715 |
| 2005/0106891 A1 * | 5/2005 | Polinsky | ........... | H01L 21/31138 |
| | | | | 257/E21.256 |
| 2007/0079758 A1 * | 4/2007 | Holland | ............... | F04D 27/0253 |
| | | | | 422/112 |
| 2008/0067146 A1 * | 3/2008 | Onishi | .................... | C23C 16/52 |
| | | | | 73/31.04 |
| 2015/0360247 A1 * | 12/2015 | Fournand | ......... | B29D 11/00009 |
| | | | | 118/697 |
| 2016/0166868 A1 * | 6/2016 | Dickinson | ......... | H01J 37/32844 |
| | | | | 588/406 |
| 2017/0062254 A1 * | 3/2017 | Hirochi | ............. | C23C 16/45574 |
| 2018/0215114 A1 * | 8/2018 | Glacet | ..................... | G02C 7/04 |
| 2018/0318758 A1 * | 11/2018 | Cox | ..................... | H05H 1/473 |
| 2020/0350183 A1 * | 11/2020 | Liang | ............... | H01L 21/67069 |
| 2022/0090263 A1 * | 3/2022 | Yahata | ............. | C23C 16/45565 |
| 2023/0268166 A1 * | 8/2023 | Lee | ..................... | H01J 37/3288 |
| | | | | 156/345.24 |

OTHER PUBLICATIONS

International Search Report and Written Opinion for Applicatiion No. PCT/US2023/027853 dated Nov. 6, 2023.

* cited by examiner

SYSTEM AND METHOD FOR CONTROLLING FORELINE PRESSURE

BACKGROUND

Field

Embodiments of the present disclosure generally relate to pressure control in semiconductor equipment and methods for the same, and more specifically, to pressure control in a foreline of a semiconductor processing chamber.

Description of the Related Art

In semiconductor manufacturing, integrated circuit (IC) are formed on semiconductor substrates through various manufacturing steps, including etching, deposition, ion implantation, and annealing. Most of these manufacturing steps are performed in a processing chamber that is maintained under vacuum during processing. Unwanted pressure variation within a processing chamber can result in process non-uniformity across the surface of a substrate being processed within the processing chamber, or between substrates processed in the processing chamber over the course of time. The process non-uniformity may be manifested as variation in deposition or etch rate, etch depth, and etch verticality, among others.

Semiconductor manufacturers typically have multiple production lines, each line comprising a plurality of processing chambers of the same type designed to perform the same type process, such as etching. Chamber-to-chamber pressure variations between chambers of the same or different production lines difficult make processing yields difficult to maintain, and may introduce undesirable variation between completed device.

Thus, there is a need for improved pressure control in semiconductor equipment and manufacturing techniques.

SUMMARY

A system and method for controlling pressure in a foreline of a processing system are disclosed herein that reduce variation in foreline pressure. In one example, a processing system is provided that includes a first process chamber, a first pump, a foreline, and a first foreline pressure control system. The first pump has an inlet and an outlet. The inlet of the first pump coupled to an exhaust port of the first process chamber. The foreline is coupled to the outlet of the first pump. The first foreline pressure control system is fluidly coupled to the foreline downstream of the first pump. The first foreline pressure control system is operable to control a pressure in the foreline independent from operation of the first pump.

In another example, a processing system includes a first processing chamber, a first pump, a second processing chamber, a second pump, a second foreline segment, a foreline, a first pressure control system, a second pressure control system, and an abatement system fluidly disposed on the foreline. The first pump having an inlet coupled to an exhaust port of the first processing chamber and an outlet coupled to an inlet of a first foreline segment. The second pump has an inlet coupled to the exhaust port of the second processing chamber and an outlet coupled to an inlet of a second foreline segment. The foreline is coupled to outlets of the first and second foreline segments. The first pressure control system is interfaced with the first foreline segment. The second pressure control system is interfaced with the second foreline segment. The first pressure control system is operable to control a pressure in the first foreline segment independent from operation of each of first and second pumps. The second pressure control system is operable to control a pressure in the second foreline segment independent from control of pressure within the first foreline.

In yet another example, a method of controlling pressure in a processing system is provided that includes measuring a first foreline pressure downstream of a first pump coupled to an exhaust port of a first processing chamber at a first time; comparing the measured first foreline pressure to a first set point; and adjusting the first foreline pressure by a first pressure control system interfaced with the foreline downstream of the first pump based on the comparison between the measured first foreline pressure and the first set point.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

Many of the details, dimensions, angles, and other features shown in the Figures are merely illustrative of particular implementations. Accordingly, other implementations can have other details, components, dimensions, angles, and features without departing from the spirit or scope of the present disclosure. In addition, further implementations of the disclosure can be practiced without several of the details described below

DETAILED DESCRIPTION

The present disclosure disclosed herein, a system and method for controlling pressure in a foreline of a processing system. It has been found that variation in the foreline pressure of the processing system provides challenges to control the pressure within the processing chamber, which can result in uniformities within the processing of semiconductor wafers. To resolve these issues, a foreline pressure control system is disclosed herein which enables the foreline pressure to be controlled in a manner that pressure fluctuation within the processing chamber is beneficially reduced. The foreline pressure control system can communicate with the processing system controller to accommodate changes in the set points during different stages of substrate processing within the processing system, thus enabling improved processing uniformity through various stages of substrate processing wherein the internal processing chamber pressures may change. The foreline pressure system leverages modulating valves and/or gas injection along with pressure feedback control sequences in order to maintain the pressure in the foreline at a desired target set point. This advantageously results in more uniform processing of substrates, increased yield, reduced waste, increased efficiency of processing, and lower cost of ownership.

Figure 1:
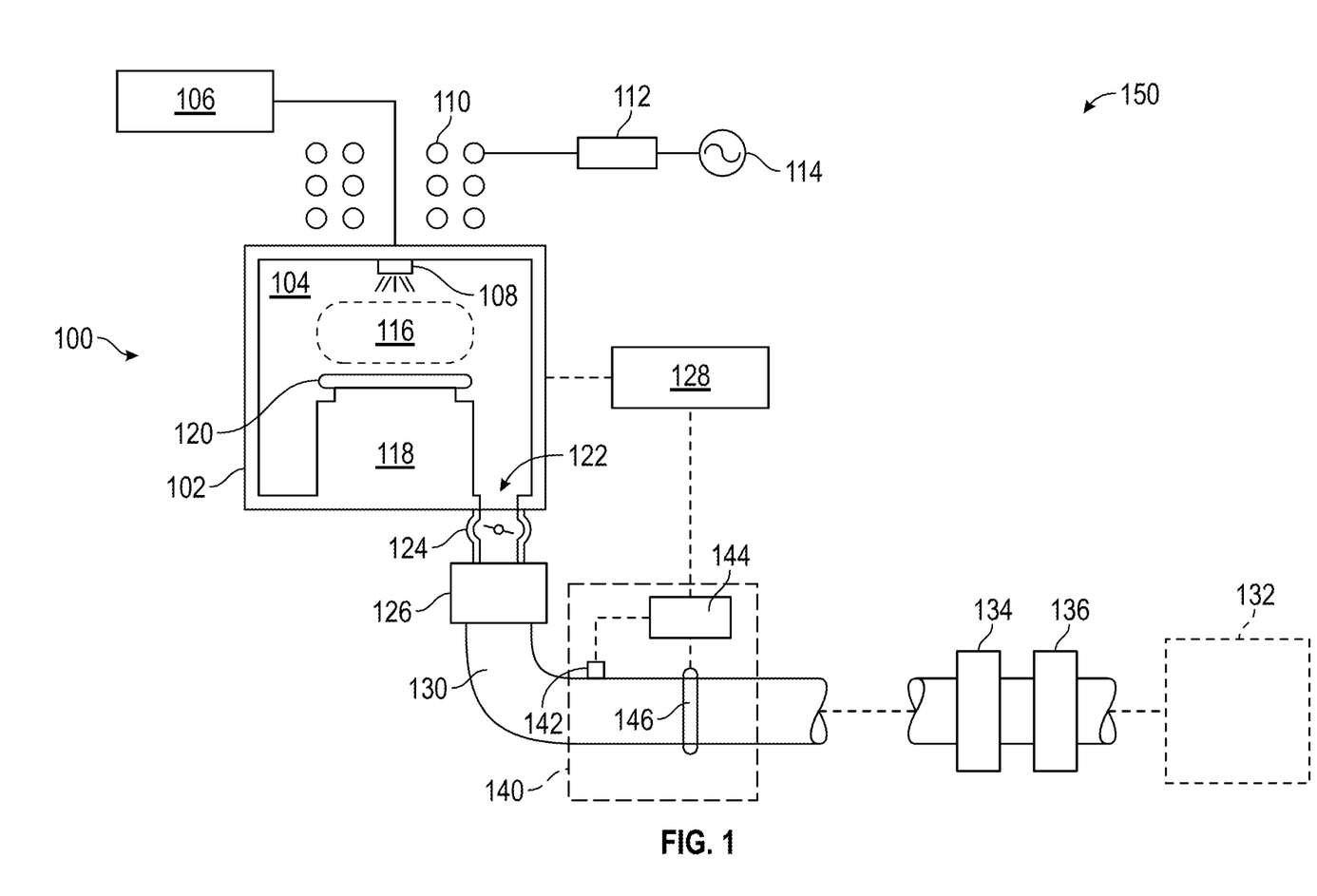
FIG. 1 illustrates a schematic view of a processing system having a processing chamber coupled to a foreline equipped with a foreline pressure control system, according to certain aspects of the present disclosure.

FIG. 1 depicts a schematic view of a processing system 150 including a processing chamber 100 connected to a foreline pressure control system 140. The foreline pressure control system 140 is configured to control the pressure in a foreline 130 coupled to the processing chamber 100, which in term, reduces pressure variation within the processing chamber itself. The processing chamber 100 is a vacuum processing chamber, such as an etch reactor processing chamber, an ion implant chamber, a deposition chamber, a plasma treatment chamber, an atomic layer deposition chamber, etc. The processing chamber 100 may be, for example, a processing chamber for carrying out a deposition process, an etching process, an annealing process or a cleaning process, among others on a substrate 120. Representative chambers for carrying out a deposition process include deposition chambers, such as, for example, plasma enhanced chemical vapor deposition (PECVD) chambers, chemical vapor deposition (CVD) chambers, or physical vapor deposition (PVD) chambers. Representative chambers for carrying out an etch process include reactive ion etch chambers, and inductively coupled plasma etch chambers, among others.

The processing chamber 100 has a chamber body 102 with an interior volume 104, and a substrate support 118. A gas source 106 is coupled to the chamber body 102 by a gas inlet 108 to provide, for example, reactive gases used for processing. A plasma 116 may be formed within the interior volume 104 of the processing chamber 100 by applying RF power to a plasma generator 110. The RF power is provide to the plasma generator 110 from an RF power source 114 through a match circuit 112.

Residual gasses, for example, unreacted or reacted gasses from the processing chamber 100 interior volume 104, are evacuated from the interior volume 104 through a chamber exhaust port 122. A throttle valve 124 is disposed proximate to the chamber exhaust port 122 to control the pressure within the interior volume 104 of the processing chamber 100. The outlet of the throttle valve 124 is coupled to an inlet of a chamber evacuation pump 126. An outlet of the chamber evacuation pump 126 is coupled to the foreline 130.

The foreline 130 serves as a conduit that routes residual gasses leaving the processing chamber 100 through the chamber evacuation pump 126 and throttle valve 124. The foreline pressure control system 140 is coupled to the foreline 130 downstream of the chamber evacuation pump 126 and upstream of a foreline pump 136. The foreline pump 136 is utilized to maintain flow within the foreline 130 away from the processing chamber 100.

The residual gasses in the foreline 130 may contain material, which is undesirable for release into the atmosphere or may damage downstream equipment, such as the foreline pump 136. For example, the residual gasses may contain compounds and/or etchants from an etch process. Residual gasses that are unfit for atmospheric release may be conditioned to a safe state through an optional pre-pump abatement system 134. The optional pre-pump abatement system 134 may be located upstream of the foreline pump 136 on the foreline 130. Pre-pump abatement systems include, but are not limited to, units which may help in the process gas treatment which can be plasma or absorption type. Other abatement systems may be used to treat the residual gasses downstream of the foreline pump 136. FIG. 1 illustrates an optional exhaust treatment equipment. Traditional examples of abatement systems include traps and or scrubbers.

Generally, the processing chamber 100 is communicatively coupled to a system controller 128. The system controller 128 is configured to control the operation of the processing chamber 100. The system controller 128, or other suitably proposed controller, may be configured control the pressure with the foreline 130. In one example, the controller configured to control the pressure with the foreline 130 is configured to determine or measure a pressure within the foreline 130, compare the determined or measured pressure to a set point, and provide instructions to a control system interfaced with the foreline 130 based on the comparison between the determined or measured foreline pressure and the set point. The set point may be retrieved from a memory accessible by the controller. The memory may include a process recipe for controlling processing within the process chamber. The process recipe may include different foreline pressure step points associated with various stages of the process recipe, wherein each stage of the process recipe cause the processing chamber to undergo different operations and/or processing conditions, such as different processing chamber pressures, different processing chamber gas composition, and the like. When the system controller 128 controls the operation of the processing chamber and a different controller controls the pressure with the foreline 130, set points associated with different processing stages are communicated from the system controller 128 to a second controller different from the first controller. The set point at one stage in processing may be different from the set point of a second stage. For example, but not limited to, the set point of a first stage such as processing the substrate in the presence of a first gas may be different than the set point of a second stage of processing such as processing the substrate in the presence of a second gas. In another non-limiting example, the set point of a first stage such as plasma processing the substrate may be different than the set point of a second stage of processing such as cleaning the chamber after the substrate is removed.

In one example, the processing chamber 100 is communicatively coupled to a single controller (e.g., the system controller 128) configured to instruct a pressure control to a pressure control device capable of pressure regulation in foreline 130. In some embodiments, a processing chamber controller (the system controller 128 as represented in FIG. 1) may be configured to provide instructions to a foreline pressure control system 140 which may or may not include a second controller separate and different than the system controller 128.

In one embodiment as illustrated in FIG. 1, the processing chamber 100 is communicatively coupled to a system controller 128. The system controller 128 may contain hardware and software that enables an operator to, for example, instruct, set, start, or stop a desired function of the system. The system controller 128 controls the operation of the processing chamber 100, for example, the operation of the throttle valve 124, the chamber evacuation pump 126, the RF power source 114, the gas source 106, and the like, such that the substrate 120 may be processed within the processing chamber 100.

During processing of the substrate 120, the system controller 128 controls the various internal conditions of the processing chamber 100, such as pressure, temperature and the like. For example, when the substrate 120 is etched within the processing chamber 100, the system controller 128 controls the pressure within the internal volume 104 during different stages of the etch process. Each stage of the etch process may have a different target internal volume pressure which can be maintained via operation of the gas source 106, throttle valve 124 and/or first pump 136 as instructed by the system controller 128. For example, one stage of the etch process may have a first target internal volume pressure that is different than a second target internal volume pressure at another stage of the etch process. Each target internal volume pressure has an associated foreline target pressure set point.

The system controller 128 is configured to provide the foreline target pressure set point to a foreline pressure system controller 144 of the foreline pressure control system 140. The system controller 128 sends a signal indicative of the foreline target pressure set point to foreline pressure control system 140. The foreline pressure control system 140 operates to maintain the foreline pressure at or near the foreline target pressure set point. The foreline pressure system controller 144 of the foreline pressure control system 140 includes a pressure sensor 142 and a pressure regulating device 146. The pressure sensor 142 provides foreline pressure information to the foreline pressure system controller 144. The foreline pressure system controller 144 controls the operation of the pressure regulating device 146 to adjust the pressure in the foreline 130 based on the foreline target pressure set point. Foreline pressure information provided by the sensor 142 to the foreline pressure system controller 144 may also be utilized to controls the operation of the pressure regulating device 146 to adjust the pressure in the foreline 130 based on the sensed foreline pressure.

Figure 2:
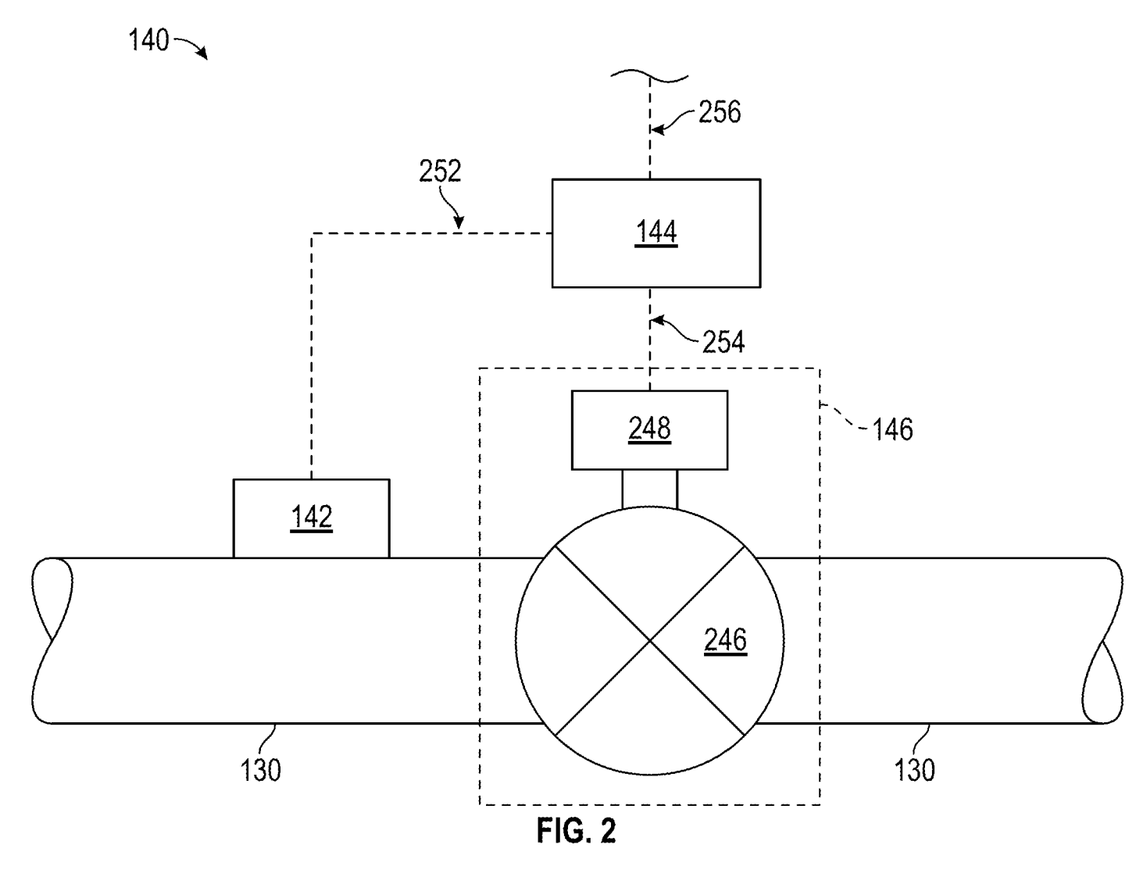
FIG. 2 illustrates a schematic view of a foreline pressure control system utilizing a modulating valve with a controller coupled to the processing chamber pressure control system, according to certain aspects of the present disclosure.

FIG. 2 depicts an exemplary schematic view of the foreline pressure control system 140. As discussed above, the foreline pressure control system 140 includes the pressure sensor 142, the foreline pressure system controller 144, and the pressure regulating device 146. The pressure regulating device 146 depicted in FIG. 2 includes an actuator 248 coupled to a modulating valve 246.

Generally, the pressure sensor 142 may be a pressure sensor suitable for measuring pressure within the foreline 130. Stated differently, the pressure sensor 142 may be a pressure sensor suitable for determining the pressure within the foreline 130. The pressure may be mechanically sensed and later converted to a digital or serial softlink signal used for feedback signaling through an output wire 252 that connects the pressure sensor 142 to the foreline pressure system controller 144. The output wire 252 is communicatively coupled to the foreline pressure system controller 144 to provide an input pressure signal to foreline pressure system controller 144. The input pressure signal serves as a status regulator of the pressure sensor 142 to adjust foreline 130 pressure by modulation of the modulating valve 246.

The foreline pressure system controller 144 is configured to receive communication from the system controller 128 (shown in FIG. 1) through a input wire 256, and from pressure sensor 142 through the output wire 252. The foreline pressure system controller 144 processes the communications and outputs a voltage signal to the actuator 248. The actuator 248 is mechanically coupled to modulating valve 246. For example, the foreline pressure system controller 144 may receive a signal from the system controller 128 dictating a desired foreline 130 pressure i.e. a set point. The pressure sensor 142 will provide the current pressure status to foreline pressure system controller 144 through output wire 252. The sensed pressure signal is compared to the set point by the foreline pressure system controller 144. Based on the comparison, the foreline pressure system controller 144 will instruct the actuator 248 through output line 254 to operate the throttle modulating valve 246 to increase, decrease or maintain the pressure within the foreline 130. Pressure feedback provided by the pressure sensor 142 to foreline pressure system controller 144 and the rapid response of the throttle modulating valve 246 enable the desired set point pressure to be maintained in the foreline 130.

The actuator 248 may be a motor, pneumatic or hydraulic actuator, or other suitable actuator for controlling the operation of the modulating valve 246. The modulating valve 246 may be one of various types of typical valves such as, for example, butterfly, ball, v-ball, gate, globe, or angle valve suitable to control the pressure of a gas line. The modulating valve 246 may be fast acting, having a throttling speed of less than one second.

Figure 3:
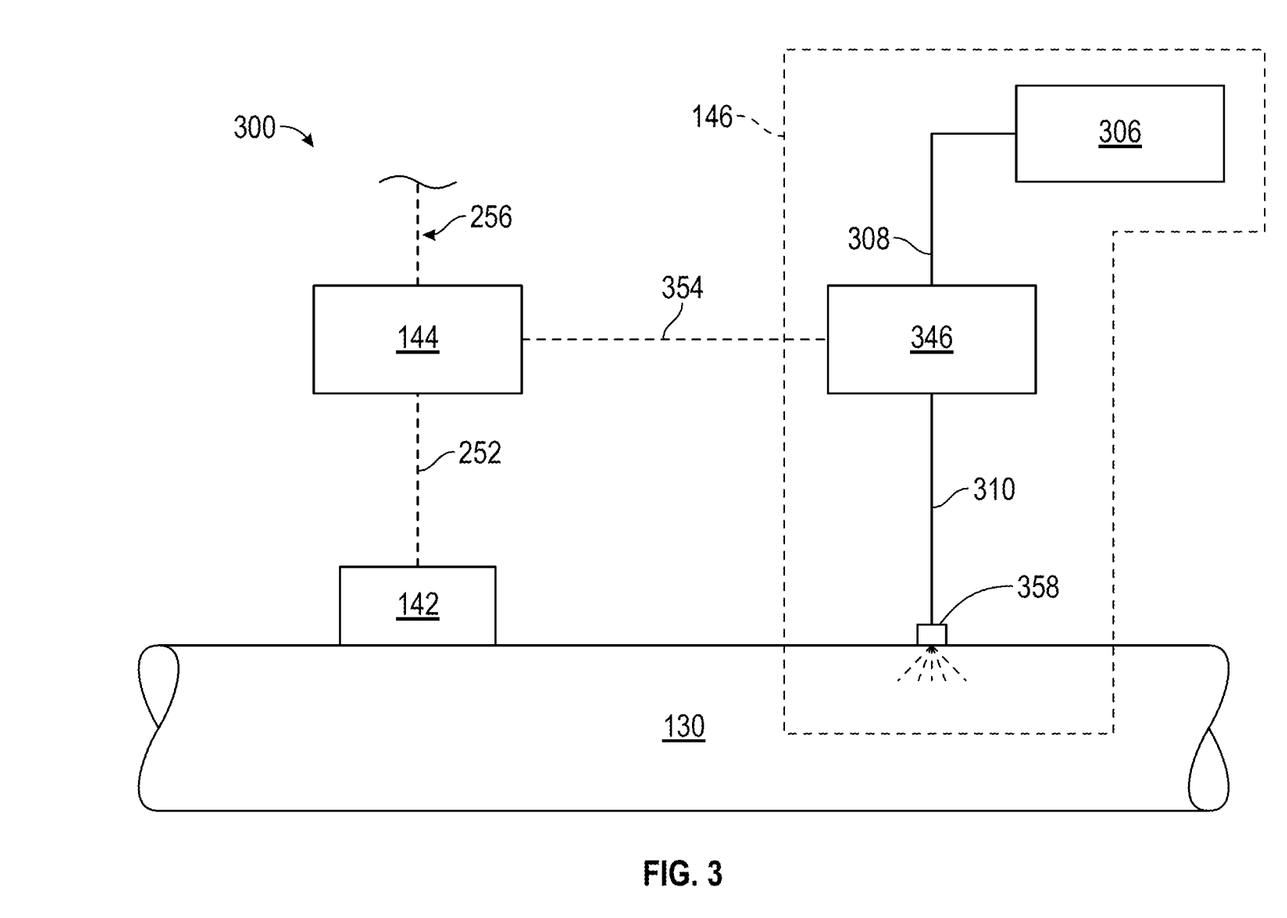
FIG. 3 illustrates a schematic view of a foreline pressure control system utilizing a mass flow controller coupled to the processing chamber pressure control system, according to certain aspects of the present disclosure.

FIG. 3 depicts an exemplary schematic view of another foreline pressure control system 300. The foreline pressure control system 300 may be used in place of the foreline pressure control system 140 illustrated in FIG. 1. Like the foreline pressure control system 140, the foreline pressure control system 300 includes the pressure sensor 142, the foreline pressure system controller 144, and the pressure regulating device 146. The pressure regulating device 146 of the foreline pressure control system 300 depicted in FIG. 3 includes a mass flow controller 346, a gas source 306, and an injection port 358. The injection port 358 is disposed on the foreline 130. The operation of the mass flow controller 346 is controlled by the foreline pressure system controller 144 to regulate an amount of gas provided by the gas source 306 into the foreline 130 through the injection port 358.

Similar to the operation of modulating valve 246 from FIG. 2, the foreline pressure system controller 144 receives communication from the system controller 128, from FIG. 1, through input wire 256, and from the pressure sensor 142 through the output wire 252. The foreline pressure system controller 144 will process the communications and deliver a voltage signal through an output signal line 354 to the mass flow controller 346 controlling an amount of gas from the gas source 306 to flow to the injection port 358 and into foreline 130. The gas source 306 is coupled to the inlet of the mass flow controller 346 through gas supply line 308. The gas line 310 couples the gas output of the mass flow controller 346 to the injection port 358 so that gas may be controllably delivered from the gas source 306 into the foreline 130 at a dynamic rate that enables pressure within the foreline 130 to be maintained at or adjusted to a desired target set point based on the pressure sensed by the pressure sensor 142.

In one embodiment, the gas source 306 may be one or more cylinder gas bottles. In another embodiment, the gas source 306 may be a facility gas provided with the building. The gas source 306 may be configured to provide an inert gases, such as helium, neon and argon. However, other unreactive gases may also be utilized, such as air.

Figure 4:
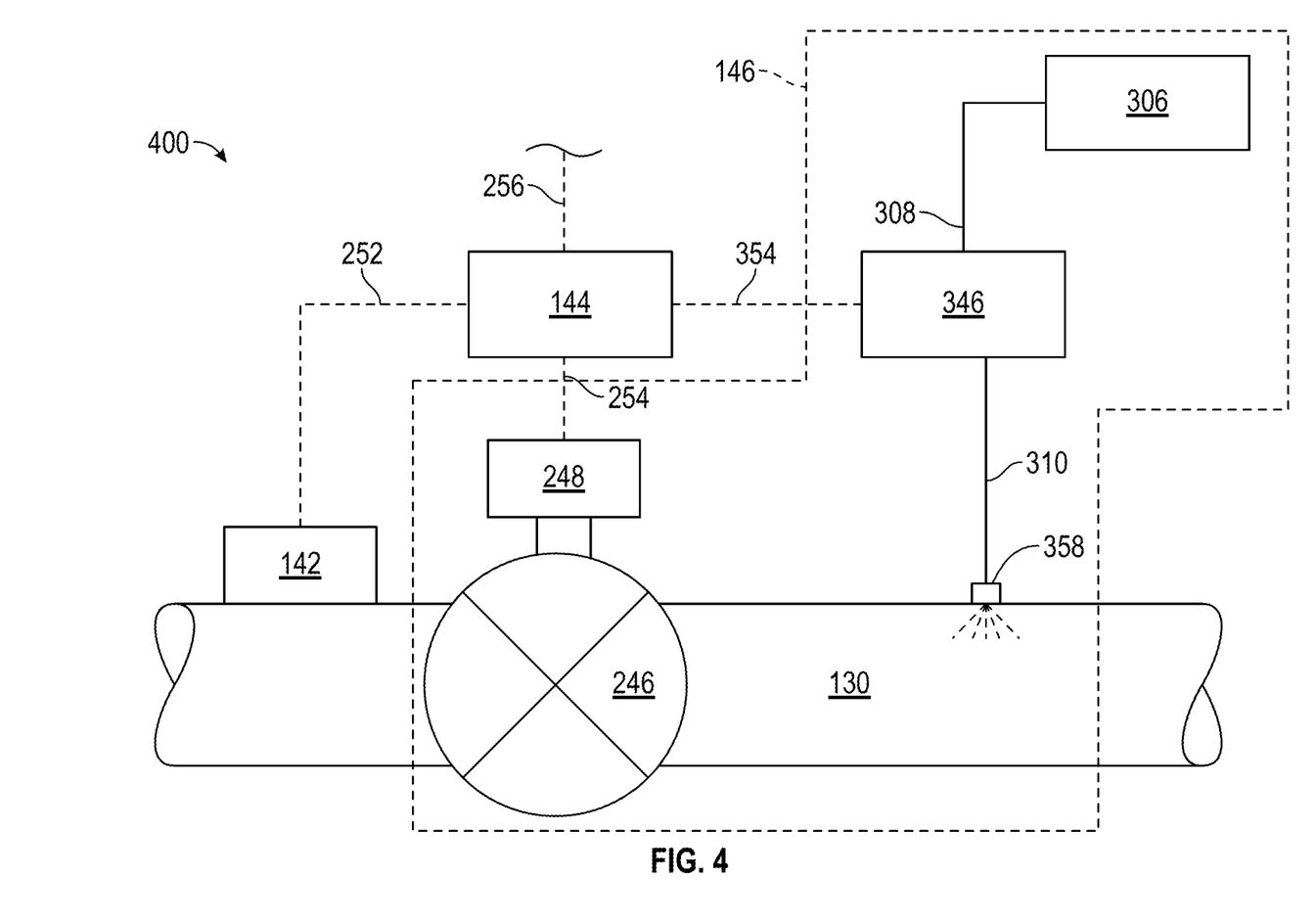
FIG. 4 illustrates a schematic view of a foreline pressure control system utilizing a modulating valve with a controller and a mass flow controller coupled to a processing chamber pressure control system, according to certain aspects of the present disclosure.

FIG. 4 depicts an exemplary schematic view of the foreline pressure control system 400. The foreline pressure control system 400 may be used in place of the foreline pressure control system 140 illustrated in FIG. 1. Like the foreline pressure control system 140, the foreline pressure control system 400 includes the pressure sensor 142, the foreline pressure system controller 144, and the pressure regulating device 146. The pressure regulating device 146 of the foreline pressure control system 400 depicted in FIG. 4 includes both an actuator 248 coupled to a modulating valve 246, and a gas source 306 coupled by a mass flow controller 346 to an injection port 358. The injection port 358 is disposed on the foreline 130. The operation of the mass flow controller 346 and the modulating valve 246 are controlled by the foreline pressure system controller 144 to regulate an amount of gas provided by the gas source 306 into the foreline 130 through the injection port 358, and/or to control the conductance within the foreline 130 using the modulating valve 246.

The foreline pressure system controller 144 may receive communication from the system controller 128 (as shown in FIG. 1) through input wire 256, and from the pressure sensor 142 through the output wire 252. The foreline pressure system controller 144 will process the communications and control the operations of one or both of the mass flow controller 346 and the modulating valve 246 to control the pressure in the foreline 130. In one example, voltage signals are provided to one or both to the actuator 248 throttling modulating valve 246 to open or close, or in-between, through output line 254, and/or allowing a determined amount of gas from the gas source 306 to flow to the injection port 358 via the and mass flow controller 346. The gas source 306 is coupled to the inlet of the mass flow controller 346 through gas supply line 308. The gas line 310 couples the output of the mass flow controller 346 to the injection port 358 so that gas may be controllably delivered from the gas source 306 into the foreline 130 at a dynamic rate that enables pressure within the foreline 130 to be maintained or adjusted to a desired pressure based on the target set point provided by system controller 128, and status indication of the pressure sensed by the pressure sensor 142. Feedback adjustments are continuously received by foreline pressure system controller 144 to achieve foreline 130 pressure control and ultimately processing chamber 100, from FIG. 1, pressure control.

In one embodiment, a feedforward pressure control scheme is contemplated to anticipate variations in pressure. Empirical analysis of equipment operations is performed at steady-state operation to determine system fluctuations. For example, the initial pressure pulse of starting a downstream piece of equipment while the processing chamber is processing a substrate, may cause a pressure variation inside the processing chamber of, for example, 5 mTorr, until the pressure is adjusted using an embodiment of the foreline pressure control system 300. This adjustment may be recorded in control logic and used to anticipate the pressure variance upon the next startup operation of that equipment thus reducing or substantially eliminating system pressure variation.

In one embodiment of the foreline pressure control system 300, feedback signals may be delayed via use of, for example, a timer algorithm or a valve position indicator. An embodiment of FIG. 4, provides both gas injection into the foreline 130 and throttling of flow within the foreline 130 are used together for controlling the foreline pressure. For example, the system controller 128 provides a first target set point to foreline pressure system controller 144 corresponding to a first time or stage of a process being performed in the processing chamber 100. The initial response to control pressure may be to provide a voltage signal to actuator 248 throttling modulating valve 246. If the target set point pressure is not achieved, the foreline pressure system controller 144 may then initiate a voltage signal to the mass flow controller 346 to allow a determined amount of gas to be injected into the foreline 130. In another embodiment, the mass flow controller is utilized first to change the foreline pressure, followed by modulating valve if necessary. In yet another embodiment, the modulating valve stem position indicator is utilized.

In still another embodiment, the system controller 128 provides a second target set point to foreline pressure system controller 144 corresponding to a second time or stage of the process being performed in the processing chamber 100 that is different than the prior time/stage. The foreline pressure system controller 144 provides instructions to one or both of the modulating valve 246 and the mass flow controller 346 to begin the foreline pressure in line with the second set point.

Figure 5:
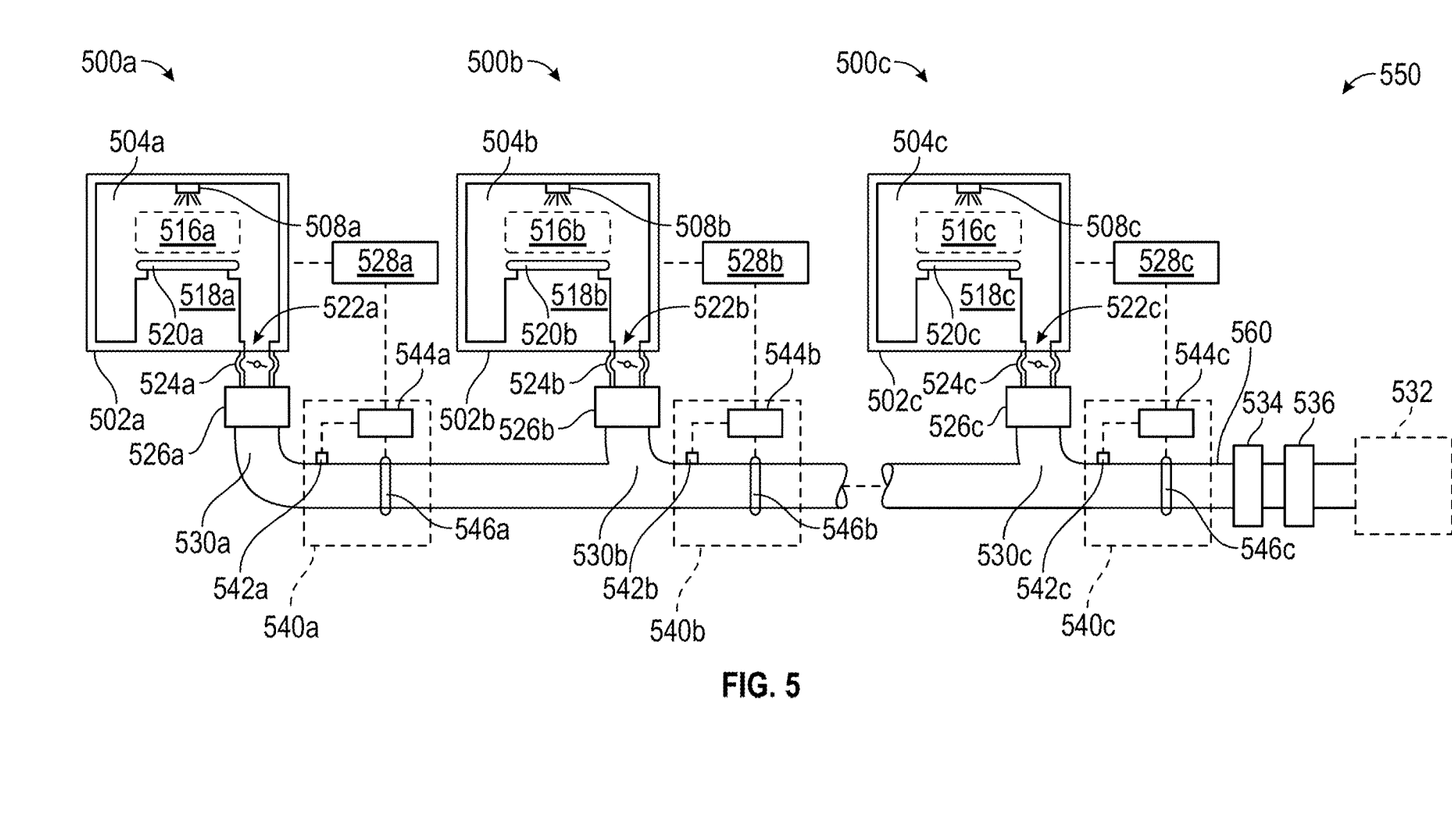
FIG. 5 illustrates a schematic view of multiple processing systems having each processing chamber coupled to a foreline equipped with a foreline pressure control system, each foreline coupled to the other forelines via a common foreline, according to certain aspects of the present disclosure.

FIG. 5 depicts an exemplary schematic view of a network 550 of processing chambers 500. Although in the example depicted in FIG. 5 three processing chambers 500a, 500b, 500c are shown, the network 550 comprises or more processing chambers 500 coupled to a common foreline 560. In one embodiment, each processing chambers 500a, 500b, and 500c of the network 550 of processing chambers 500 is coupled by a respective one of a foreline segment 530a, 530b, 530c to the common foreline 130. While FIG. 5 illustrates an independent foreline pressure control systems 540a, 540b, and 540c, each foreline 530a, 530b, 530c, may be coupled together upstream of a single foreline pressure control system. While FIG. 5 illustrates a common optional pre-pump abatement system 534, a foreline pump 536, and an optional exhaust treatment equipment 532, there may be an independent optional pre-pump abatement system 534, foreline pump 536, and an optional exhaust treatment equipment 532, for each of the processing chambers 500a, 500b, 500c, within the network 550 of processing chambers 500. In another embodiment, the processing chambers 500a, 500b, and 500c are coupled to a single foreline pressure control system and multiple downstream equipment in parallel such as, for example, one path may an optional pre-pump abatement system 534, a foreline pump 536, and the other path may be a foreline pump 536 and an optional exhaust treatment equipment 532.

Processing chambers 500a, 500b, 500c, may vary in pressure during normal processing operations. Each processing chamber 500a, 500b, 500c is regulated by their independent system controllers 528a, 528b, 528c which communicate to their respective foreline pressure control system 544a, 544b, 544c to regulate the pressure in the foreline 530a, 530b, and 530c. In one example, the system controllers 528a, 528b, 528c are operable to maintain pressure variations to less than 50 mTorr within each processing chamber 500*a*, 500*b*, 500*c*. Therefore, embodiments of the foreline pressure control system 544*a*, 544*b*, 544*c* may be in any combination as illustrated by FIG. 2, 3, or 4 to control pressure within the architecture of the forelines 530*a*, 530*b*, and 530*c*.

Figure 6:
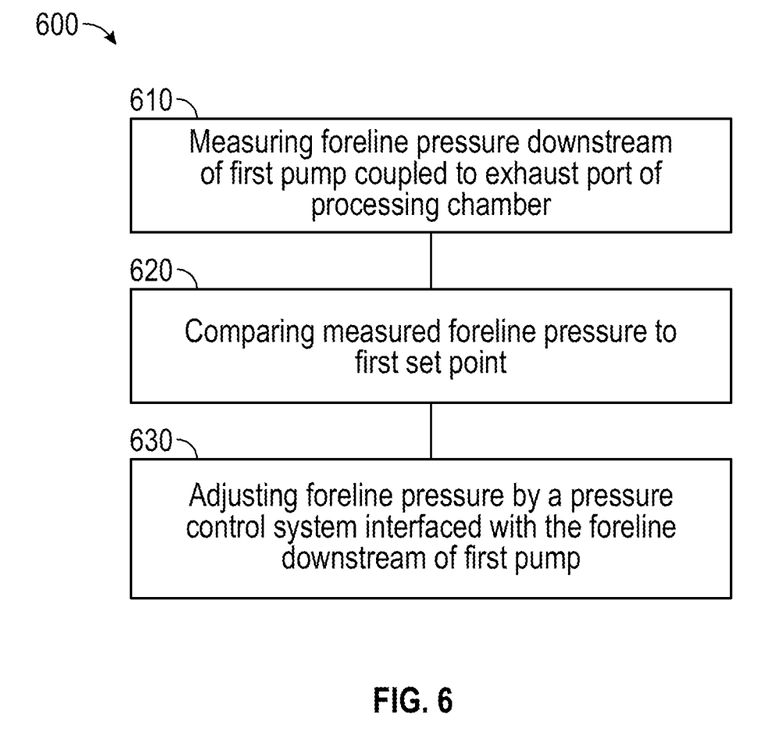
FIG. 6 is a flow diagram of a method for controlling a pressure in a foreline, according to certain aspects of the present disclosure.

FIG. 6 is a flow diagram of a method 600 for controlling a pressure in a foreline, such as the foreline 130 of the processing systems 150, 660, or other suitable processing chamber. The method 600 beings at operation 610 by measuring a first foreline pressure downstream of a first pump coupled to an exhaust port of a first processing chamber at a first time. As described above, the first foreline pressure may be measured by the pressure sensor 142 and provided to the foreline pressure system controller 144. The first time may be associated with a first stage of a process being performed in the processing chamber 100.

At operation 620, the measured first foreline pressure is compared to a first foreline pressure set point by the foreline pressure control system. The first foreline pressure set point may be provided to the foreline pressure control system in any suitable manner. In one example, the foreline pressure control system obtains the first foreline pressure set point from the system controller that controls the operation of the processing system. The first foreline pressure set point may be associated with a specific stage or time of the substrate process being performed in the processing system. In some embodiments, multiple foreline pressure set points are provided in bulk or over time to the foreline pressure control system from the system controller, where each foreline pressure set point is associated with a different time or stage of the substrate process being performed in the processing system. At the different time or stage of the substrate process being performed in the processing system, the pressure within the processing chamber may be different.

At operation 630, the first foreline pressure is adjusted by operation of the first pressure control system interfaced with the foreline downstream of the first pump based on the comparison between the measured first foreline pressure and the first set point. The first foreline pressure may be adjusted by changing the conductance of the foreline by operation of a throttle valve disposed downstream of the pump coupled to the chamber exhaust. Additionally, or in the alternative, the first foreline pressure may be adjusted by introducing gas into to the foreline disposed downstream of the pump coupled to the chamber exhaust.

The method 600 may also include measuring a second foreline pressure downstream of a second pump coupled to an exhaust port of a second processing chamber, comparing the measured second foreline pressure to a second set point, and adjusting the second foreline pressure by a second pressure control system interfaced with the foreline downstream of the second pump based on the comparison between the measured second foreline pressure and the second set point.

Thus, methods and systems have been disclosed the control the pressure with the foreline independent of the operation of pumps and throttle valves coupled immediately downstream of the chamber exhaust. The foreline pressure control system reduces pressure fluctuation both within the foreline and the processing chamber. The foreline pressure control system accommodate changes in the set points during different stages of substrate processing, which enables improved processing uniformity, increased yield, reduced waste, increased efficiency of processing, and lower cost of ownership.

While the foregoing is directed to embodiments of the present disclosure, other and further embodiments of the disclosure may be devised without departing from the basic scope thereof, and the scope thereof is determined by the claims that follow.

What is claimed is:

1. A semiconductor processing system, comprising:
a controller configured to:
   determine a first foreline pressure in a foreline downstream of a first pump coupled to an exhaust port of a first processing chamber at a first time;
   compare the determined first foreline pressure to a first set point; and
   provide instructions to a first pressure control system interfaced with the foreline downstream of the first pump based on the comparison between the determined first foreline pressure and the first set point to adjust the first foreline pressure.

2. The semiconductor processing system of claim 1, wherein the first pressure control system comprises:
a foreline pressure system controller configured to receive the first set point from a system controller configured to control operation of the first processing chamber.

3. The semiconductor processing system of claim 2 further comprising:
the first pressure control system;
a pressure sensor coupled to the foreline pressure system controller; and
a foreline pressure regulating device coupled to the foreline pressure system controller and configured to control pressure in the foreline based on pressure metrics obtained by the pressure sensor.

4. The semiconductor processing system of claim 3, wherein the foreline pressure regulating device includes a modulating valve is disposed in the foreline.

5. The semiconductor The processing system of claim 4, wherein the modulating valve has a throttling speed of less than 1 second.

6. The semiconductor processing system of claim 3, wherein the foreline pressure regulating device includes a pressure regulating device configured to introduce gas into the foreline downstream of the first pump.

7. The semiconductor processing system of claim 6, wherein the pressure regulating device further comprises a mass flow controller.

8. The semiconductor processing system of claim 6, wherein the pressure regulating device further comprises a gas source.

9. The semiconductor processing system of claim 8, wherein the gas source is configured to supply nitrogen, air, helium, neon, or argon.

10. The semiconductor processing system of claim 8, wherein the gas source comprises at least one of a facility gas supply, ambient air, or a gas cylinder.

11. The semiconductor processing system of claim 2, wherein the system controller is configured to output the first set point and a second set point to the foreline pressure system controller, the first and second set points based on target foreline pressures from different stages of a process performed in the processing chamber.

12. The semiconductor processing system of claim 3, wherein the foreline pressure regulating device is configured to maintain the foreline pressure within 50 mTorr of the set point.

13. The semiconductor processing system of claim 1 further comprising:

the first process chamber having the controller coupled thereto;

a first pump having an inlet and an outlet, the inlet of the first pump coupled to the exhaust port of the first process chamber, the outlet of the first pump coupled to the foreline; and the first foreline pressure control system fluidly coupled to the foreline downstream of the first pump, the first foreline pressure control system is configured to control a pressure in the foreline independent from operation of the first pump.

14. The semiconductor processing system of claim 13 further comprising:

an abatement system fluidly coupled the foreline downstream of the first foreline pressure control system.

15. The semiconductor processing system of claim 13, wherein the foreline comprises a first foreline segment and a second foreline segment coupled to a main foreline, the first foreline segment coupled to the first processing chamber, the second foreline segment coupled to a second processing chamber.

16. The semiconductor processing system of claim 15 further comprising:

a second foreline pressure control system coupled to the second foreline segment, the second foreline pressure control system is configured to control pressure in the second foreline segment independent of the first foreline pressure control system.

17. The semiconductor processing system of claim 1 further comprising:

the first pressure control system, wherein the first pressure control system comprises a pressure sensor, a modulating valve, a foreline pressure system controller and a second pressure control system comprising a mass flow controller, a gas source, and a gas injection port.

* * * * *